United States Patent
Jo et al.

(10) Patent No.: US 12,287,646 B2
(45) Date of Patent: Apr. 29, 2025

(54) APPARATUS FOR CONTROLLING ROBOT AND METHOD THEREOF

(71) Applicants: Hyundai Motor Company, Seoul (KR); Kia Corporation, Seoul (KR); MOBINN Inc., Suwon (KR)

(72) Inventors: Sun Myoung Jo, Ansan (KR); Jin Choi, Seoul (KR); Hoon Chung, Hwaseong (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 288 days.

(21) Appl. No.: 18/053,281

(22) Filed: Nov. 7, 2022

(65) Prior Publication Data
US 2023/0409051 A1 Dec. 21, 2023

(30) Foreign Application Priority Data
Jun. 15, 2022 (KR) .................. 10-2022-0073077

(51) Int. Cl.
*G05D 1/00* (2024.01)
(52) U.S. Cl.
CPC ................... *G05D 1/0891* (2013.01)
(58) Field of Classification Search
CPC ......... G05D 2105/285; G05D 2109/13; G05D 2111/20; G05D 1/242; G05D 1/495; G05D 1/20; G05D 1/435; G05D 1/498; G05D 2111/64; B25J 13/089; B25J 5/007; B25J 9/1694; B62D 57/022; B62D 57/024
USPC ....................................... 701/22
See application file for complete search history.

(56) References Cited

U.S. PATENT DOCUMENTS

| | | | |
|---|---|---|---|
| 8,644,991 B2 * | 2/2014 | Ohm | B25J 5/005 700/250 |
| 10,493,617 B1 * | 12/2019 | Holson | B25J 5/007 |
| 2005/0065662 A1 * | 3/2005 | Reindle | A47L 9/2821 701/1 |

(Continued)

FOREIGN PATENT DOCUMENTS

| CN | 106882283 A | * | 6/2017 |
|---|---|---|---|
| CN | 107186736 B | | 9/2017 |

(Continued)

OTHER PUBLICATIONS

D. Lin, P. Zhou and Z. J. Cendes, "In-Depth Study of the Torque Constant for Permanent-Magnet Machines," in IEEE Transactions on Magnetics, vol. 45, No. 12, pp. 5383-5387, Dec. 2009, doi: 10.1109/TMAG.2009.2026043. (Year: 2009).*

*Primary Examiner* — Adam R Mott
*Assistant Examiner* — James Miller Watts, III
(74) *Attorney, Agent, or Firm* — Slater Matsil, LLP

(57) ABSTRACT

In an embodiment a robot control apparatus includes at least one first sensor provided on a front of a head part of a robot including a wheel part and the head part connected to an upper portion of the wheel part, the first sensor being configured to sense a first distance from a ground, at least one second sensor provided on a rear of the head part and configured to sense a second distance from the ground and a controller configured to determine a driving environment of the robot based on at least one of the first distance or the second distance and adjust a control gain related to a balance control of the robot based on the determined driving environment.

20 Claims, 11 Drawing Sheets

(56) References Cited

U.S. PATENT DOCUMENTS

| | | | | |
|---|---|---|---|---|
| 2006/0097683 A1* | 5/2006 | Hosoda | ................ | B62D 57/024 |
| | | | | 318/568.12 |
| 2015/0274032 A1* | 10/2015 | Nakamura | .............. | B60L 3/106 |
| | | | | 701/70 |
| 2018/0177652 A1* | 6/2018 | Furman | ................. | A61G 7/1073 |
| 2023/0047500 A1* | 2/2023 | Lafontaine | ............. | B62D 51/04 |

FOREIGN PATENT DOCUMENTS

| | | | | | | |
|---|---|---|---|---|---|---|
| CN | 212281225 | U | * | 1/2021 | | |
| CN | 118121413 | B | * | 8/2024 | | |
| JP | 2006247802 | A | * | 9/2006 | ........... | B62D 57/024 |
| JP | 2009040365 | A | * | 2/2009 | ........... | B62K 11/007 |
| JP | 2009042145 | A | | 2/2009 | | |
| KR | 101135692 | B | | 4/2012 | | |
| KR | 2017083854 | A | * | 7/2017 | ............. | B25J 11/00 |
| KR | 1020170083854 | A | | 7/2017 | | |
| KR | 102069719 | B | | 1/2020 | | |
| KR | 2022061691 | A | * | 5/2022 | ............. | B60Q 1/076 |

* cited by examiner

APPARATUS FOR CONTROLLING ROBOT AND METHOD THEREOF

CROSS-REFERENCE TO RELATED APPLICATIONS

This application claims the benefit of Korean Application No. 10-2022-0073077, filed on Jun. 15, 2022, which application is hereby incorporated herein by reference.

TECHNICAL FIELD

The present disclosure relates to an apparatus and a method for controlling a robot, and more particularly, relates to a robot control apparatus and a method for adjusting a control gain of a robot moving through wheels.

BACKGROUND

As the demands for mobility that can be used for various purposes other than existing automobiles increase, studies on unmanned delivery robots are also being increasingly conducted. A robot having a two-wheeled structure including left and right wheels according to the related art may load objects in a loading space of a head part connected to upper portions of the left and right wheels and may deliver the objects to desired places. It is important for the robot having the two-wheeled structure to maintain balance forward and rearward, and the robot having the two-wheel structure requires appropriate balance control. For the balance control, the robot having the two-wheeled structure may change the center of gravity through a movement of the head part. Furthermore, the robot having the two-wheeled structure may be equipped with flexible wheels to which an ABG guide system is applied and may freely travel on an obstacle, such as stairs or steps.

The robot having the two-wheeled structure that is equipped with the flexible wheels has to apply different control gains of balance control depending on driving situations to perform appropriate balance control. Accordingly, a technology for automatically setting a control gain related to balance control of a robot having a two-wheeled structure is required.

SUMMARY

Embodiments provide advantages and solutions to the above-mentioned problems.

Various embodiments provide a robot control apparatus and a method for adjusting a control gain of a robot that moves through wheels.

Various other embodiments provide a robot control apparatus and a method for applying different control gains of balance controls depending on a driving environments.

Yet various other embodiments provide a robot control apparatus and method for automatically adjusting a control gain of a robot such that manual control is not required.

Some embodiments provide a robot control apparatus and a method for performing stable balance control of a robot by automatically adjusting a control gain related to balance control of a robot.

Some other embodiments provide a robot control apparatus and a method for recognizing a driving environment using a simple distance sensor rather than a sensor having a complex structure, such as lidar, camera, radar, or the like, and performing appropriate balance control of a robot corresponding to the driving environment.

According to an embodiment of the present disclosure, a robot control apparatus includes at least one first sensor that is provided on the front of a head part of a robot including a wheel part and the head part connected to an upper portion of the wheel part and that senses a distance from the ground, at least one second sensor that is provided on the rear of the head part and that senses a distance from the ground, and a controller that determines a driving environment of the robot, based on at least one of the distance from the ground being sensed through the first sensor or the distance from the ground being sensed through the second sensor and adjusts a control gain related to balance control of the robot, based on the determined driving environment.

In an embodiment, the controller may determine whether the driving environment of the robot corresponds to at least one of a situation in which the robot travels on a flat ground, a situation in which the robot climbs up stairs or steps, or a situation in which the robot climbs down stairs or steps.

In an embodiment, the first sensor may be disposed on the front bottom of the head part, and the second sensor may be disposed on the rear bottom of the head part.

In an embodiment, the controller may determine whether the driving environment of the robot corresponds to a situation in which the robot travels on a flat ground, based on whether the distance from the ground being sensed through the first sensor and the distance from the ground being sensed through the second sensor are within a threshold value from a first reference value and may adjust the control gain related to the balance control of the robot to a first control gain corresponding to the situation in which the robot travels on the flat ground, when it is determined that the driving environment of the robot corresponds to the situation in which the robot travels on the flat ground.

In an embodiment, the controller may determine whether the driving environment of the robot corresponds to a situation in which the robot climbs up stairs or steps, based on whether the distance from the ground being sensed through the first sensor or the distance from the ground being sensed through the second sensor is smaller than or equal to a second reference value and may adjust the control gain related to the balance control of the robot to a second control gain corresponding to the situation in which the robot climbs up the stairs or steps, when it is determined that the driving environment of the robot corresponds to the situation in which the robot climbs up the stairs or steps.

In an embodiment, the controller may determine whether the driving environment of the robot corresponds to a situation in which the robot climbs down stairs or steps, based on whether the distance from the ground being sensed through the first sensor or the distance from the ground being sensed through the second sensor is greater than or equal to a third reference value and may adjust the control gain related to the balance control of the robot to a third control gain corresponding to the situation in which the robot climbs down the stairs or steps, when it is determined that the driving environment of the robot corresponds to the situation in which the robot climbs down the stairs or steps.

In an embodiment, the controller may determine whether the situation in which the robot climbs up the stairs or steps is completed, based on whether the distance from the ground being sensed through the first sensor or the distance from the ground being sensed through the second sensor in the situation in which the robot climbs up the stairs is smaller than or equal to a fourth reference value and may adjust the control gain related to the balance control of the robot to a fourth control gain corresponding to the completion of the situation in which the robot climbs up the stairs or steps, when it is determined that the situation in which the robot climbs up the stairs or steps is completed.

In an embodiment, the controller may maintain the control gain related to the balance control of the robot at the fourth control gain until a preset period of time elapses, when it is determined that the situation in which the robot climbs up the stairs or steps is completed.

In an embodiment, the controller may determine the driving environment of the robot in consideration of an amount of current to drive a wheel included in the wheel part.

In an embodiment, the controller may determine the driving environment of the robot in consideration of an amount of torque of a wheel included in the wheel part.

In an embodiment, the controller may determine the driving environment of the robot in consideration of a degree to which the head part is inclined.

In an embodiment, the at least one first sensor may include a sensor provided on a front left side of the head part and a sensor provided on a front right side of the head part. The at least one second sensor may include a sensor provided on a rear left side of the head part and a sensor provided on a rear right side of the head part. The controller may control vertical heights of left and right wheels included in the wheel part, based on at least one of the distance from the ground being sensed through the at least one first sensor or the distance from the ground being sensed through the at least one second sensor.

According to another embodiment of the present disclosure, a robot control method includes a step of sensing, by at least one first sensor, a distance from the ground, the first sensor being provided on the front of a head part of a robot including a wheel part and the head part connected to an upper portion of the wheel part, a step of sensing, by at least one second sensor, a distance from the ground, the second sensor being provided on the rear of the head part, a step of determining, by a controller, a driving environment of the robot, based on at least one of the distance from the ground being sensed through the first sensor or the distance from the ground being sensed through the second sensor, and a step of adjusting, by the controller, a control gain related to balance control of the robot, based on the determined driving environment.

In an embodiment, the step of determining, by the controller, the driving environment of the robot may include a step of determining, by the controller, whether the driving environment of the robot corresponds to at least one of a situation in which the robot travels on a flat ground, a situation in which the robot climbs up stairs or steps, or a situation in which the robot climbs down stairs or steps.

In an embodiment, the step of determining, by the controller, the driving environment of the robot may include a step of determining, by the controller, whether the driving environment of the robot corresponds to a situation in which the robot travels on a flat ground, based on whether the distance from the ground being sensed through the first sensor and the distance from the ground being sensed through the second sensor are within a threshold value from a first reference value, and the step of adjusting, by the controller, the control gain related to the balance control of the robot may include a step of adjusting, by the controller, the control gain related to the balance control of the robot to a first control gain corresponding to the situation in which the robot travels on the flat ground, when it is determined that the driving environment of the robot corresponds to the situation in which the robot travels on the flat ground.

In an embodiment, the step of determining, by the controller, the driving environment of the robot may include a step of determining, by the controller, whether the driving environment of the robot corresponds to a situation in which the robot climbs up stairs or steps, based on whether the distance from the ground being sensed through the first sensor or the distance from the ground being sensed through the second sensor is smaller than or equal to a second reference value, and the step of adjusting, by the controller, the control gain related to the balance control of the robot may include a step of adjusting, by the controller, the control gain related to the balance control of the robot to a second control gain corresponding to the situation in which the robot climbs up the stairs or steps, when it is determined that the driving environment of the robot corresponds to the situation in which the robot climbs up the stairs or steps.

In an embodiment, the step of determining, by the controller, the driving environment of the robot may include a step of determining, by the controller, whether the driving environment of the robot corresponds to a situation in which the robot climbs down stairs or steps, based on whether the distance from the ground being sensed through the first sensor or the distance from the ground being sensed through the second sensor is greater than or equal to a third reference value, and the step of adjusting, by the controller, the control gain related to the balance control of the robot may include a step of adjusting, by the controller, the control gain related to the balance control of the robot to a third control gain corresponding to the situation in which the robot climbs down the stairs or steps, when it is determined that the driving environment of the robot corresponds to the situation in which the robot climbs down the stairs or steps.

In an embodiment, the step of determining, by the controller, the driving environment of the robot may further include a step of determining, by the controller, whether the situation in which the robot climbs up the stairs or steps is completed, based on whether the distance from the ground being sensed through the first sensor or the distance from the ground being sensed through the second sensor in the situation in which the robot climbs up the stairs is smaller than or equal to a fourth reference value, and the step of adjusting, by the controller, the control gain related to the balance control of the robot may further include a step of adjusting, by the controller, the control gain related to the balance control of the robot to a fourth control gain corresponding to the completion of the situation in which the robot climbs up the stairs or steps and maintaining, by the controller, the fourth control gain until a preset period of time elapses, when it is determined that the situation in which the robot climbs up the stairs or steps is completed.

In an embodiment, the step of determining, by the controller, the driving environment of the robot may include a step of determining, by the controller, the driving environment of the robot in consideration of at least one of an amount of current to drive a wheel included in the wheel part, an amount of torque of the wheel included in the wheel part, or a degree to which the head part is inclined.

In an embodiment, the step of sensing, by the at least one first sensor, the distance from the ground may include a step of sensing, by the at least one first sensor including a sensor provided on a front left side of the head part and a sensor provided on a front right side of the head part, the distance from the ground. The step of sensing, by the at least one second sensor, the distance from the ground may include a step of sensing, by the at least one second sensor including a sensor provided on a rear left side of the head part and a sensor provided on a rear right side of the head part, the distance from the ground. The robot control method may further include a step of controlling, by the controller, vertical heights of left and right wheels included in the wheel part, based on at least one of the distance from the ground being sensed through the at least one first sensor or the distance from the ground being sensed through the at least one second sensor.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Figure 1:
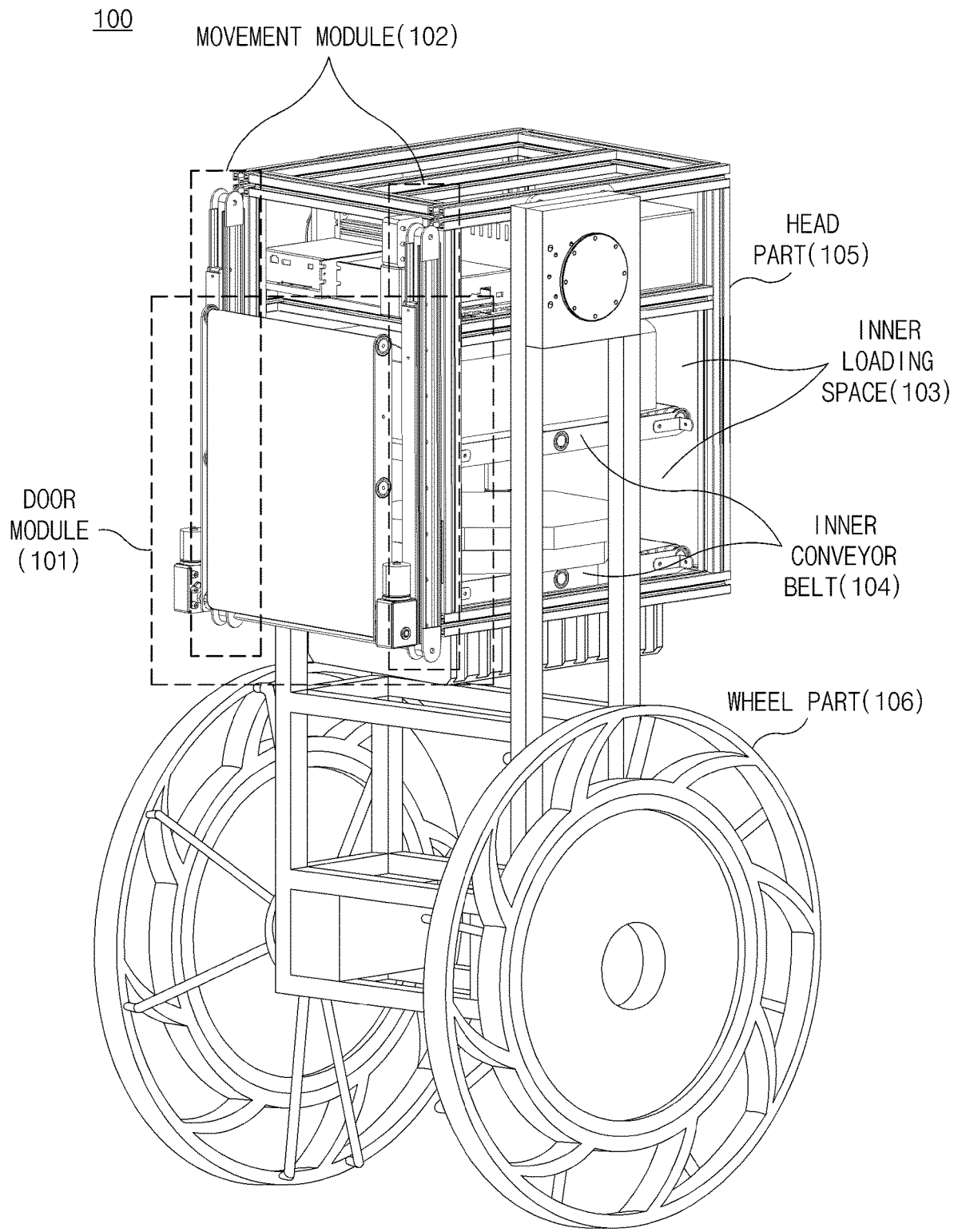
FIG. 1 is a view illustrating the shape of a robot including a robot control apparatus according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 9.

FIG. 1 is a view illustrating the shape of a robot including a robot control apparatus according to an embodiment of the present disclosure.

Referring to FIG. 1, for example, when the robot 100 has a delivery function, the robot 100 may include a door module 101, a movement module 102, and inner conveyor belts 104

For example, the robot 100 may include a head part 105 that forms an inner loading space 103.

For example, the head part 105 may form inner loading spaces 103 in one or more layers in the vertical direction.

For example, the robot wo may include a wheel part 106 that is coupled to one side of the head part 105 and that includes one or more wheels. For example, the wheel part 106 may be coupled to a lower side of the head part 105.

For example, the robot wo may further include the movement module 102 coupled to an opposite side of the head part 105 and movable relative to the head part 105.

For example, one part of the movement module 102 may be fixedly coupled to the head part 105, and another part of the movement module 102 may be movable relative to the head part 105 in the vertical direction. For example, the movement module 102 may be coupled to the front of the head part 105.

For example, the inner conveyor belts 104 may be provided at lower ends of the inner loading spaces 103 that form the one or more layers and may be operated by a motor.

For example, the inner conveyor belts 104 may operate to move objects placed thereon in the front-rear direction of the robot 100.

Figure 2:
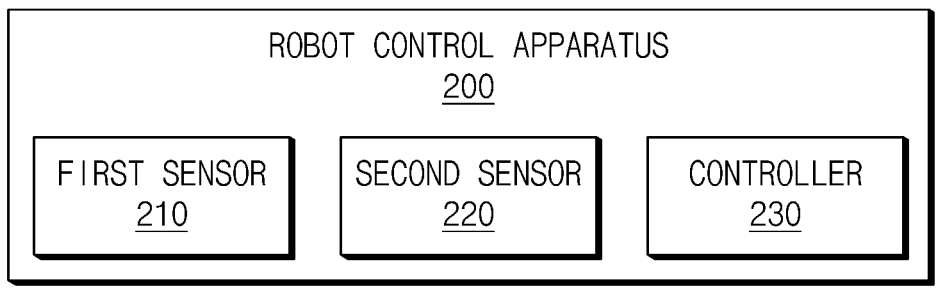
FIG. 2 is a block diagram illustrating the robot control apparatus according to an embodiment of the present disclosure.

FIG. 2 is a block diagram illustrating the robot control apparatus according to an embodiment of the present disclosure.

The robot control apparatus 200 according to the present disclosure may be implemented inside or outside the robot. In this case, the robot control apparatus 200 may be integrally formed with internal control units of the robot, or may be implemented with a separate hardware device and may be connected with the control units of the robot.

For example, the robot control apparatus 200 may be integrated with the robot, may be implemented in a form in which the robot control apparatus 200 is installed on/attached to the robot as a component separate from the robot, or may be implemented in a form in which one part is integrated with the robot and another part is installed on/attached to the robot as a component separate from the robot.

Referring to FIG. 2, the robot control apparatus 200 may include at least one first sensor 210, at least one second sensor 220, and a controller 230.

The first sensor 210 may be provided on the front of the head part of the robot and may sense the distance from the ground.

For example, the first sensor 210 may be disposed on the front bottom of the head part.

For example, the at least one first sensor 210 may include a sensor provided on a front left side of the head part and a sensor provided on a front right side of the head part.

The second sensor 220 may be provided on the rear of the head part of the robot and may sense the distance from the ground.

For example, the second sensor 220 may be disposed on the rear bottom of the head part.

For example, the at least one second sensor 220 may include a sensor provided on a rear left side of the head part and a sensor provided on a rear right side of the head part.

The first sensor 210 and the second sensor 220 may be distinguished from each other depending on the positions thereof. The first sensor 210 and the second sensor 220 may be disposed on the bottom of the head part and may sense the distances from the sensors to the ground.

For example, each of the first sensor 210 and the second sensor 220 may include an ultrasonic transmitter and an ultrasonic receiver, may measure the time for ultrasonic waves reflected from the ground to return to the ultrasonic receiver, and may sense the distance from the sensor to the ground, based on the measured time.

For example, the first sensor 210 and the second sensor 220 may transfer information about the sensed distances to the ground to the controller 230.

The controller 230 may perform overall control to enable components to normally perform functions thereof. The controller 230 may be implemented in the form of hardware or software, or in a combination thereof. The controller 230 may preferably be implemented with a microprocessor, but is not limited thereto. Furthermore, the controller 230 may perform various data processing or computation that will be described below.

The controller 230 may include a processor that performs the data processing and/or the computation that will be described below. Furthermore, the controller 230 may include memory that stores data or an algorithm required in the process of performing the data processing and/or the computation.

The processor included in the controller 230 may be an electrical circuit that executes commands of software. For example, the processor included in the controller 230 may be an electronic control unit (ECU), a micro controller unit (MCU), or another low-level controller.

The memory included in the controller 230 may include at least one type of storage medium among memories of a flash memory type, a hard disk type, a micro type, and a card type (e.g., a Secure Digital (SD) card or an eXtream Digital (XD) card) and memories of a Random Access Memory (RAM) type, a Static RAM (SRAM) type, a Read-Only Memory (ROM) type, a Programmable ROM (PROM) type, an Electrically Erasable PROM (EEPROM) type, a Magnetic RAM (MRAM) type, a magnetic disk type, and an optical disk type.

The controller 230 may determine a driving environment of the robot, based on at least one of the distance from the ground being sensed through the first sensor 210 or the distance from the ground being sensed through the second sensor 220.

For example, the driving environment of the robot may refer to at least one of a situation in which the robot travels on a flat ground, a situation in which the robot climbs up stairs or steps, or a situation in which the robot climbs down stairs or steps.

In a situation in which the robot travels on a flat ground, the distance from the position where the wheel part makes contact with the ground to the position where the sensor is attached may be measured through the sensor as the distance from the ground.

However, in a situation in which the robot travels on stairs, a value different from the distance from the position where the wheel part makes contact with the ground to the position where the sensor is attached may be measured through the sensor as the distance from the ground.

That is, for example, the controller 230 may determine whether the driving environment of the robot corresponds to at least one of a situation in which the robot travels on a flat ground, a situation in which the robot climbs up stairs or steps, or a situation in which the robot climbs down stairs or steps.

When the robot travels on a flat ground, both the distance to the ground being sensed by the first sensor provided on the front of the head part and the distance to the ground being sensed by the second sensor provided on the rear of the head part may be measured to approximate to the distance from the position where the wheel part makes contact with the ground to the position where the sensor is attached.

For example, the controller 230 may determine whether the driving environment of the robot corresponds to a situation in which the robot travels on a flat ground, based on whether the difference between the distance from the ground being sensed through the first sensor 210 or the distance from the ground being sensed through the second sensor 220 and a first reference value is within a preset threshold value.

Here, the first reference value may preferably be set as the vertical distance from the position where the wheel part makes contact with the ground to the position where the sensor is attached.

For example, when the difference between the distance from the ground being sensed through the first sensor 210 or the distance from the ground being sensed through the second sensor 220 and the first reference value is within the preset threshold value, the controller 230 may determine that the driving environment of the robot corresponds to the situation in which the robot travels on the flat ground.

When the robot climbs up stairs (or, steps) through forward driving, the distance to the ground being sensed by the first sensor provided on the front of the head part may be measured as the vertical distance from the ground (a stair that the robot is to climb up) at a position higher than the position of the ground in contact with the wheel part to the first sensor.

When the robot climbs up stairs (or, steps) through reverse driving, the distance to the ground being sensed by the second sensor provided on the rear of the head part may be measured as the vertical distance from the ground (a stair that the robot is to climb up) at a position higher than the position of the ground in contact with the wheel part to the second sensor.

Accordingly, for example, the controller 230 may determine whether the driving environment of the robot corresponds to a situation in which the robot climbs up stairs or steps, based on whether the distance from the ground being sensed through the first sensor 210 or the distance from the ground being sensed through the second sensor 220 is smaller than or equal to a second reference value.

Here, the second reference value may be a value smaller than the first reference value, and the second reference value may preferably be determined as the first reference value minus the preset threshold value.

For example, when the distance from the ground being sensed through the first sensor 210 or the distance from the ground being sensed through the second sensor 220 is smaller than or equal to the second reference value, the controller 230 may determine that the driving environment of the robot corresponds to the situation in which the robot climbs up the stairs or steps.

When the robot climbs down stairs (or, steps) through forward driving, the distance to the ground being sensed by the first sensor provided on the front of the head part may be measured as the vertical distance from the ground (a stair that the robot is to climb down) at a position lower than the position of the ground in contact with the wheel part to the first sensor.

When the robot climbs down stairs (or, steps) through reverse driving, the distance to the ground being sensed by the second sensor provided on the rear of the head part may be measured as the vertical distance from the ground (a stair that the robot is to climb down) at a position higher than the position of the ground in contact with the wheel part to the second sensor.

Accordingly, for example, the controller 230 may determine whether the driving environment of the robot corresponds to a situation in which the robot climbs down stairs or steps, based on whether the distance from the ground being sensed through the first sensor 210 or the distance from the ground being sensed through the second sensor 220 is greater than or equal to a third reference value.

Here, the third reference value may be a value greater than the first reference value, and the third reference value may preferably be determined as the first reference value plus the preset threshold value.

For example, when the distance from the ground being sensed through the first sensor 210 or the distance from the ground being sensed through the second sensor 220 is greater than or equal to the third reference value, the controller 230 may determine that the driving environment of the robot corresponds to the situation in which the robot climbs down the stairs or steps.

For example, when it is determined that the driving environment of the robot corresponds to a situation in which the robot climbs up stairs or steps, the controller 230 may determine whether the distance from the ground being sensed through the first sensor 210 or the distance from the ground being sensed through the second sensor 220 is smaller than or equal to a fourth reference value.

When the robot completely climbs up stairs (or, steps) through forward driving and travels on a flat ground, the distance to the ground being sensed by the first sensor provided on the front of the head part may be measured to approximate to the distance from the position where the wheel part makes contact with the ground to the position where the sensor is attached.

When the robot completely climbs up stairs (or, steps) through reverse driving and travels on a flat ground, the distance to the ground being sensed by the second sensor provided on the rear of the head part may be measured to approximate to the distance from the position where the wheel part makes contact with the ground to the position where the sensor is attached.

For example, when it is determined that the driving environment of the robot corresponds to a situation in which the robot climbs up stairs or steps, the controller 230 may determine whether the situation in which the robot climbs up the stairs or steps is completed, based on whether the distance from the ground being sensed through the first sensor 210 or the distance from the ground being sensed through the second sensor 220 is smaller than or equal to the fourth reference value.

Here, the fourth reference value may preferably be determined as a value that is equal to, or similar to, the second reference value.

For example, when the distance from the ground being sensed through the first sensor 210 or the distance from the ground being sensed through the second sensor 220 is measured to be smaller than or equal to the fourth reference value after it is determined that the driving environment of the robot corresponds to a situation in which the robot climbs up stairs or steps, the controller 230 may determine that the situation in which the robot climbs up the stairs or steps is completed.

For example, the controller 230 may determine the driving environment of the robot in consideration of the amount of current to drive the wheels included in the wheel part.

Here, the amount of current to drive the wheels may refer to the amount of current of the motor that drives the wheels.

For example, when the robot climbs up stairs, a larger amount of current may be required than when the robot travels on a flat ground to climb up the stairs.

For example, when the robot climbs down stairs, a smaller amount of current may be required than when the robot travels on a flat ground to climb up the stairs.

Accordingly, the controller 230 may determine the driving environment of the robot in consideration of the amount of current of the motor, which drives the wheels, together with the distances from the ground being measured by the first sensor 210 and the second sensor 220.

For example, the controller 230 may determine whether the driving environment of the robot is a specific driving environment, by determining whether the distances from the ground being measured by the first sensor 210 and the second sensor 220 satisfy a distance range condition corresponding to the specific driving environment at the same time that the amount of current of the motor, which drives the wheels, satisfies a preset current amount range condition corresponding to the specific driving environment (a situation in which the robot travels on a flat ground, a situation in which the robot climbs up stairs, or a situation in which the robot climbs down stairs).

Specifically, when the distances from the ground being measured by the first sensor 210 and the second sensor 220 satisfy the distance range condition corresponding to the specific driving environment at the same time that the amount of current of the motor, which drives the wheels, satisfies the preset current amount range condition corresponding to the specific driving environment, the controller 230 may determine that the driving environment of the robot is the specific driving environment.

For example, a preset current amount range corresponding to a situation in which the robot travels on a flat ground may be a range higher than a preset current amount range corresponding to a situation in which the robot climbs down stairs, and a preset current amount range corresponding to a situation in which the robot climbs up stairs may be a range higher than the preset current amount range corresponding to the situation in which the robot travels on the flat ground.

For example, the controller 230 may determine the driving environment of the robot in consideration of the amount of torque of the wheels included in the wheel part.

Here, the amount of torque of the wheels may refer to the amount of torque of the motor that drives the wheels.

For example, when the robot climbs up stairs, a larger amount of motor torque may be required than when the robot travels on a flat ground to climb up the stairs.

For example, when the robot climbs down stairs, a smaller amount of motor torque may be required than when the robot travels on a flat ground to climb up the stairs.

Accordingly, the controller 230 may determine the driving environment of the robot in consideration of the amount of torque of the motor, which drives the wheels, together with the distances from the ground being measured by the first sensor 210 and the second sensor 220.

For example, the controller 230 may determine whether the driving environment of the robot is a specific driving environment, by determining whether the distances from the ground being measured by the first sensor 210 and the second sensor 220 satisfy a distance range condition corresponding to the specific driving environment at the same time that the amount of torque of the motor, which drives the wheels, satisfies a preset torque amount range condition corresponding to the specific driving environment (a situation in which the robot travels on a flat ground, a situation in which the robot climbs up stairs, or a situation in which the robot climbs down stairs).

Specifically, when the distances from the ground being measured by the first sensor 210 and the second sensor 220 satisfy the distance range condition corresponding to the specific driving environment at the same time that the amount of torque of the motor, which drives the wheels, satisfies the preset torque amount range condition corresponding to the specific driving environment, the controller 230 may determine that the driving environment of the robot is the specific driving environment.

For example, a preset torque amount range corresponding to a situation in which the robot travels on a flat ground may be a range higher than a preset torque amount range corresponding to a situation in which the robot climbs down stairs, and a preset torque amount range corresponding to a situation in which the robot climbs up stairs may be a range higher than the preset torque amount range corresponding to the situation in which the robot travels on the flat ground.

For example, the controller 230 may determine the driving environment of the robot in consideration of the degree to which the head part is inclined.

When the robot travels on a flat ground, the head part may remain perpendicular to the ground, or may be inclined in the travel direction (a forward direction in the case of forward driving and a rearward direction in the case of reverse driving) to achieve torque balance.

When the robot climbs up stairs, the head part may be inclined in the travel direction (a forward direction in the case of forward driving and a rearward direction in the case of reverse driving).

When the robot climbs down stairs, the head part may be inclined in the direction opposite to the travel direction (a forward direction in the case of forward driving and a rearward direction in the case of reverse driving).

Accordingly, the controller 230 may determine the driving environment of the robot in consideration of the degree (angle) to which the head part is inclined together with the distances from the ground being measured by the first sensor 210 and the second sensor 220.

For example, the controller 230 may determine whether the driving environment of the robot is a specific driving environment, by determining whether the distances from the ground being measured by the first sensor 210 and the second sensor 220 satisfy a distance range condition corresponding to the specific driving environment at the same time that the degree to which the head part is inclined satisfies an angular range condition corresponding to the specific driving environment (a situation in which the robot travels on a flat ground, a situation in which the robot climbs up stairs, or a situation in which the robot climbs down stairs).

Specifically, when the distances from the ground being measured by the first sensor 210 and the second sensor 220 satisfy the distance range condition corresponding to the specific driving environment at the same time that the degree to which the head part is inclined satisfies the angular range condition corresponding to the specific driving environment, the controller 230 may determine that the driving environment of the robot is the specific driving environment.

When the controller 230 determines the driving environment of the robot in consideration of the degree to which the head part is inclined, the preset angular range condition corresponding to the specific driving environment with respect to the degree to which the head part is inclined may vary depending on the travel speed of the robot.

That is, a preset angular range corresponding to each specific driving environment may be set through a function related to the travel speed of the robot.

Furthermore, the controller 230 may determine the driving environment of the robot in consideration of at least one of the amount of current to drive the wheels, the amount of torque of the wheels, or the degree to which the head part is inclined, together with the distances from the ground being measured by the first sensor 210 and the second sensor 220.

The controller 230 may adjust a control gain related to balance control of the robot, based on the determined driving environment.

For example, the control gain related to the balance control of the robot may include a control gain related to control of the motor that drives the wheel part of the robot and a control gain related to torque control for maintaining the balance of the head part based on the axis of the wheel part for balance of the head part of the robot.

For example, when it is determined that the driving environment of the robot corresponds to a situation in which the robot travels on a flat ground, the controller 230 may adjust the control gain related to the balance control of the motor to a first control gain corresponding to the situation in which the robot travels on the flat ground.

For example, when it is determined that the driving environment of the robot corresponds to a situation in which the robot climbs up stairs or steps, the controller 230 may adjust the control gain related to the balance control of the motor to a second control gain corresponding to the situation in which the robot climbs up the stairs or steps.

For example, when it is determined that the driving environment of the robot corresponds to a situation in which the robot climbs down stairs or steps, the controller 230 may adjust the control gain related to the balance control of the motor to a third control gain corresponding to the situation in which the robot climbs down the stairs or steps.

A robot including flexible wheels to which an ABG guide system is applied may travel on stairs or steps. In the situation in which the robot travels on the stairs or steps, a balance control gain may be adjusted such that the robot may freely travel on an obstacle.

The first to third control gains may be control gain values determined depending on driving environments and determined to be appropriate for the driving environments, and corresponding information may be previously stored in the memory.

For example, when it is determined that a situation in which the robot climbs up stairs or steps is completed, the controller 230 may adjust the control gain related to the balance control of the motor to a fourth control gain corresponding to the completion of the situation in which the robot climbs up the stairs or steps.

For example, after the completion of the situation in which the robot climbs up the stairs or steps, the fourth control gain may be determined as a control gain determined to be appropriate for the robot to take (stabilize) the center of gravity on a flat ground.

For example, when it is determined that the situation in which the robot climbs up the stairs or steps is completed, the controller 230 may maintain the control gain related to the balance control of the robot at the fourth control gain until a preset period of time elapses.

After the completion of the situation in which the robot climbs up the stairs or steps, a specific period of time may be required for the robot to take the center of gravity on the flat ground. Therefore, the controller 230 may maintain the control gain related to the balance control of the robot at the fourth control gain until the preset period of time elapses.

For example, the controller 230 may control the vertical heights of the left and right wheels included in the wheel part, based on at least one of the distance from the ground being sensed through the first sensor 210 or the distance from the ground being sensed through the second sensor 220.

The controller 230 may determine the driving environment of the robot, based on the distances from the ground being measured by one first sensor 210 and one second sensor 220. However, to control the vertical heights of the left and right wheels, it may be required to measure the distance from the ground through at least left and right first sensors 210 and left and right second sensors 220.

Accordingly, when the heights of the grounds in contact with the left and right wheels differ from each other, the controller 230 according to the corresponding embodiment may maintain the left-right balance of the head part by controlling the vertical heights of the left and right wheels included in the wheel part.

Support rods connected between the left and right wheels and the head part may be configured such that the lengths are individually adjustable, and the controller 230 may control the vertical heights of the left and right wheels by adjusting the lengths of the support rods connected between the left and right wheels and the head part.

For example, vertical frames connected to the left and right wheels of the robot to connect the left and right wheels and the head part may be configured such that the lengths are adjustable.

For example, when the robot enters an obstacle, if the distance from the ground being sensed by a left sensor (the first sensor 210 or the second sensor 220) is smaller than the distance from the ground being sensed by a right sensor, the controller 230 may maintain the left-right balance of the head part by making the distance between the left wheel and the head part shorter or making the distance between the right wheel and the head part longer.

For example, when the robot enters an obstacle, if the distance from the ground being sensed by the right sensor (the first sensor 210 or the second sensor 220) is smaller than the distance from the ground being sensed by the left sensor, the controller 230 may maintain the left-right balance of the head part by making the distance between the right wheel and the head part shorter or making the distance between the left wheel and the head part longer.

Figure 3:
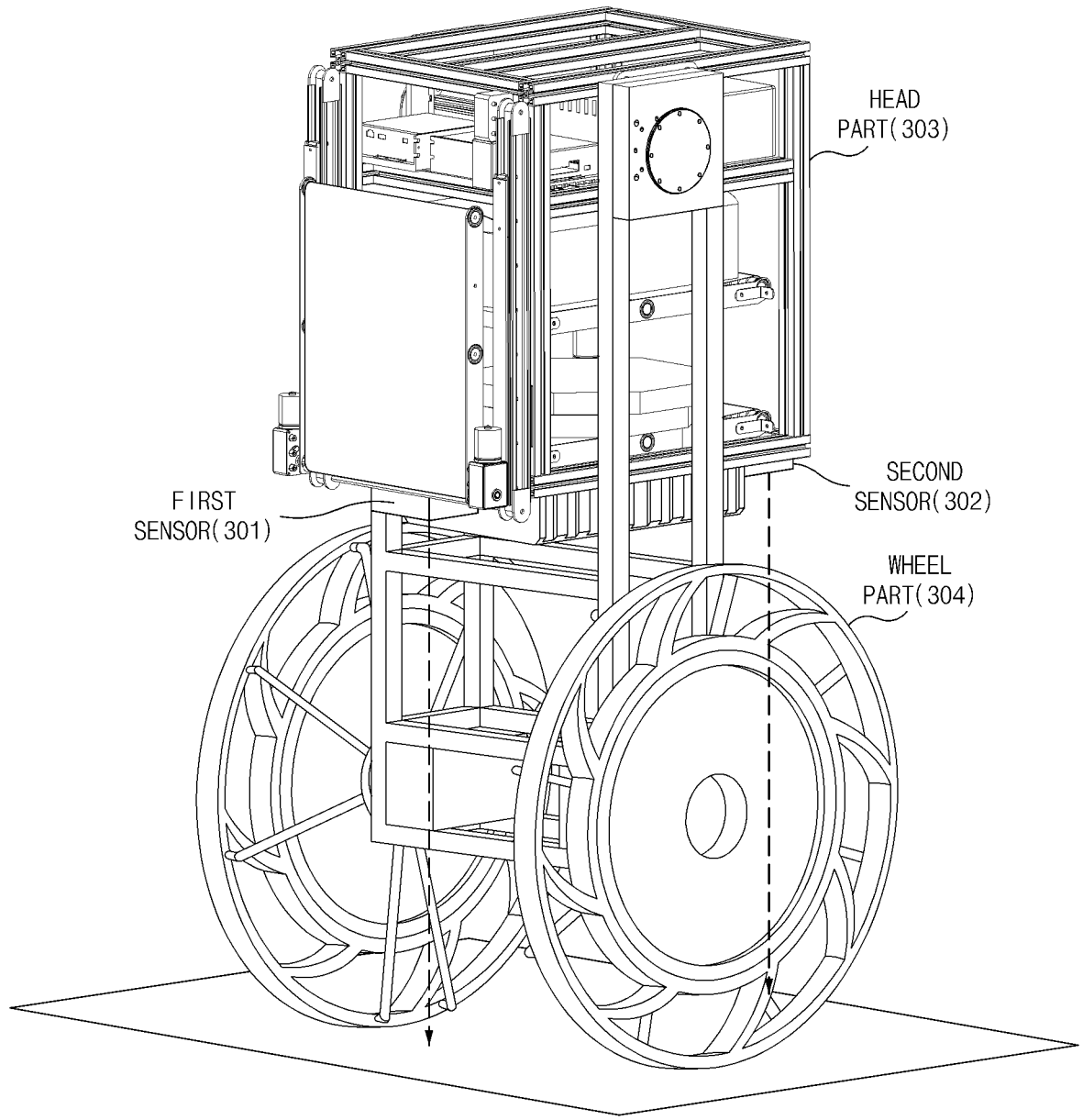
FIG. 3 is a view illustrating a robot control apparatus according to an embodiment of the present disclosure.

FIG. 3 is a view illustrating a robot control apparatus according to an embodiment of the present disclosure.

Referring to FIG. 3, a first sensor 301 and a second sensor 302 of the robot control apparatus may be provided on the front bottom and the rear bottom of a head part 303, respectively.

The first sensor 301 and the second sensor 302 may be provided on the bottom of the head part 303 and may sense the distance between the head part 303 and the ground in the lower direction perpendicular to the head part 303.

The first sensor 301 may preferably be provided at the most forward position on the bottom of the head part 303, and the second sensor 302 may preferably be provided at the most rearward position on the bottom of the head part 303. However, without being limited thereto, the first sensor 301 and the second sensor 302 may be provided at a relatively forward position and a relatively rearward position, respectively.

Here, the first sensor 301 may preferably be disposed in front of a portion of a wheel part 304 that makes contact with the ground, and the second sensor 302 may preferably be disposed behind the portion of the wheel part 304 that makes contact with the ground.

Because the first sensor 301 is disposed in front of the portion of the wheel part 304 that makes contact with the ground and the second sensor 302 is disposed behind the portion of the wheel part 304 that makes contact with the ground, the robot control apparatus may previously sense a robot climbing up or down stairs or steps and may control a control gain.

Figure 4:
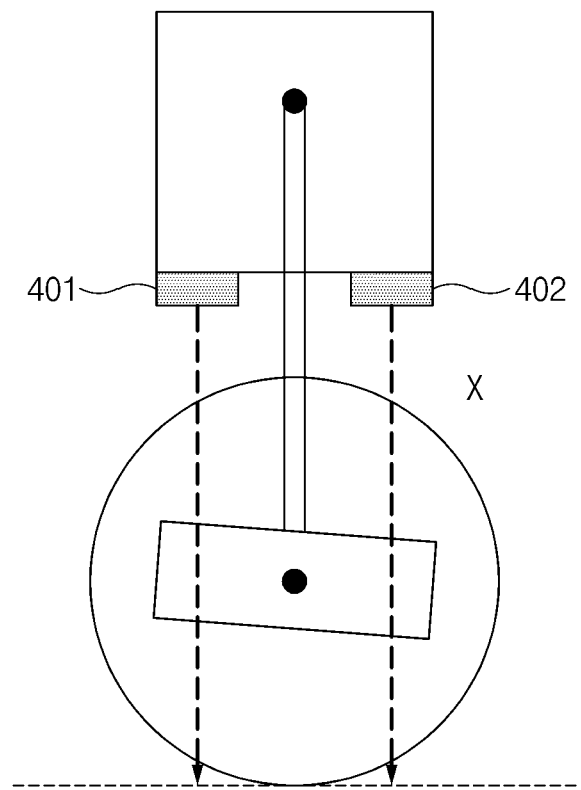
FIG. 4 is a view illustrating a situation in which a robot control apparatus and a robot travel on a flat ground according to an embodiment of the present disclosure.

FIG. 4 is a view illustrating a situation in which a robot control apparatus and a robot travel on a flat ground according to an embodiment of the present disclosure.

Referring to FIG. 4, the robot control apparatus may sense the distances from the ground through a first sensor 401 and a second sensor 402 in the situation in which the robot travels on the flat ground.

In the situation in which the robot travels on the flat ground, the robot control apparatus may determine that the distances X from the ground being sensed through the first sensor 401 and the second sensor 402 remain constant during the travel of the robot.

Furthermore, in the situation in which the robot travels on the flat ground, the robot control apparatus may determine that the distance from the ground being sensed through the first sensor 401 is equal to the distance from the ground being sensed through the second sensor 402.

Accordingly, the robot control apparatus may determine whether the robot travels on the flat ground, based on whether the distances from the ground being sensed through the first sensor 401 and the second sensor 402 remain constant during the travel of the robot and/or whether the distance from the ground being sensed through the first sensor 401 is equal to the distance from the ground being sensed through the second sensor 402.

When it is determined that the robot travels on the flat ground, the robot control apparatus may adjust a control gain related to balance control of the robot to a control gain corresponding to the situation in which the robot travels on the flat ground and may maintain the control gain corresponding to the situation.

Figure 5:
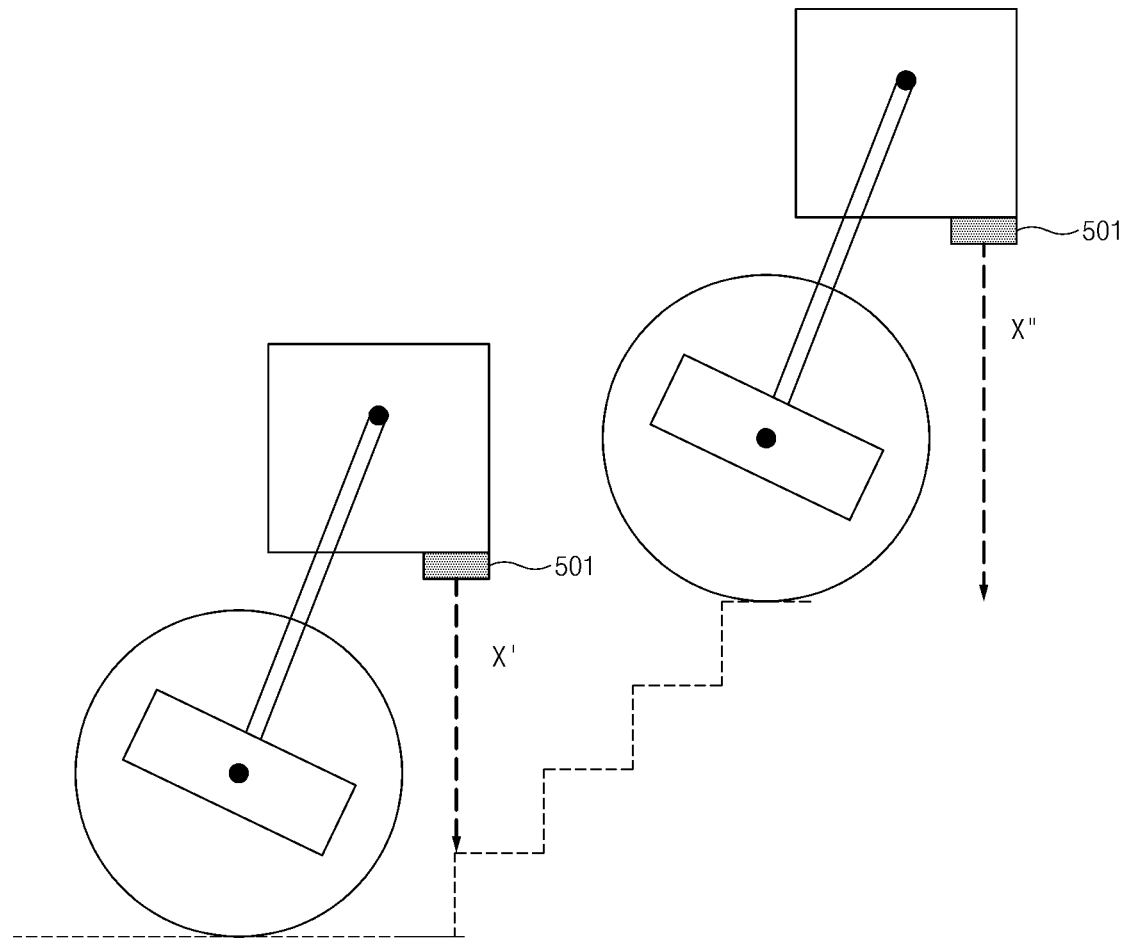
FIG. 5 is a view illustrating a situation in which a robot control apparatus and a robot climb up stairs according to an embodiment of the present disclosure.

FIG. 5 is a view illustrating a situation in which a robot control apparatus and a robot climb up stairs according to an embodiment of the present disclosure.

Referring to FIG. 5, the robot control apparatus may sense the distances from the ground through a first sensor and a second sensor in the situation in which the robot climbs up the stairs or steps.

When it is assumed that a sensor 501 located in the direction in which the robot climbs up the stairs or steps is the first sensor, the distance X' from the ground being sensed through the first sensor 501 may be smaller than a preset second reference value in the situation in which the robot climbs up the stairs or steps.

Accordingly, when the distance X' from the ground being sensed through the first sensor 501 is smaller than the preset second reference value, the robot control apparatus may determine that the robot climbs up the stairs or steps.

When it is determined that the robot climbs up the stairs or steps, the robot control apparatus may adjust a control gain related to balance control of the robot to a control gain corresponding to the situation in which the robot climbs up the stairs or steps and may maintain the control gain corresponding to the situation.

Furthermore, when the robot completely climbs up the stairs or steps and travels on a flat ground again, the robot control apparatus may determine that the distance X" from the ground being sensed through the first sensor 501 is equal to a fourth reference value that is a reference value when the robot travels on the flat ground.

Accordingly, when it is determined that the distance X" from the ground being sensed through the first sensor 501 in the situation in which the robot climbs up the stairs or steps is equal to the preset fourth reference value, the robot control apparatus may determine that the robot completely climbs up the stairs or steps.

When it is determined that the robot completely climbs up the stairs or steps, the robot control apparatus may adjust the control gain related to the balance control of the robot to a control gain corresponding to the situation in which the robot travels on the flat ground again and may maintain the control gain corresponding to the situation.

The above description has been made under the assumption that the sensor 501 located in the direction in which the robot climbs up the stairs or steps is the first sensor. However, even when the sensor 501 located in the direction in which the robot climbs up the stairs or steps is the second sensor, the robot control apparatus may determine, through a similar method, whether the robot climbs up the stairs or steps and whether the robot completely climbs up the stairs or steps.

Figure 6:
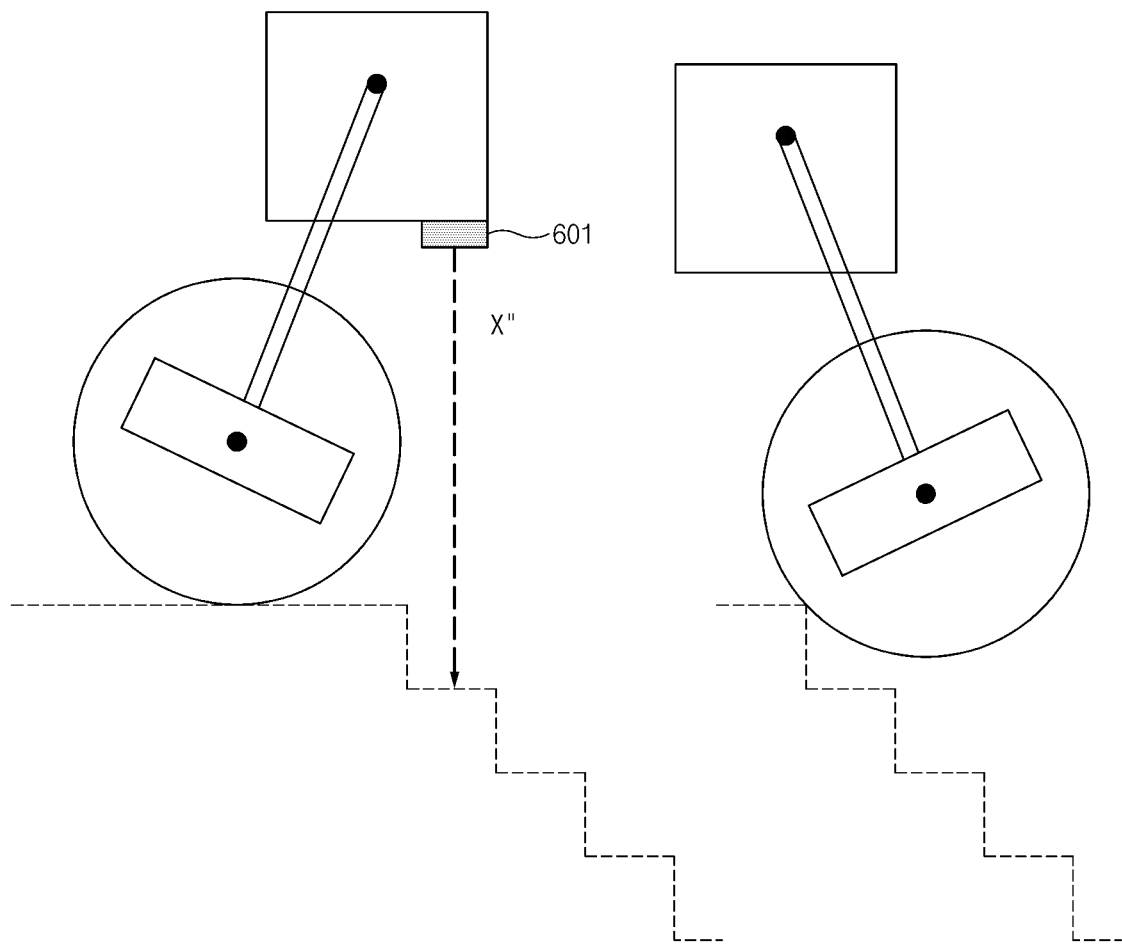
FIG. 6 is a view illustrating a situation in which a robot control apparatus and a robot climb down stairs according to an embodiment of the present disclosure.

FIG. 6 is a view illustrating a situation in which a robot control apparatus and a robot climb down stairs according to an embodiment of the present disclosure.

Referring to FIG. 6, the robot control apparatus may sense the distances from the ground through a first sensor and a second sensor in the situation in which the robot climbs down the stairs or steps.

When it is assumed that a sensor 601 located in the direction in which the robot climbs down the stairs or steps is the first sensor, the distance X''' from the ground being sensed through the first sensor 601 may be greater than a preset third reference value in the situation in which the robot climbs down the stairs or steps.

Accordingly, when the distance X''' from the ground being sensed through the first sensor 601 exceeds the preset third reference value, the robot control apparatus may determine that the robot climbs down the stairs or steps.

When it is determined that the robot climbs down the stairs or steps, the robot control apparatus may adjust a control gain related to balance control of the robot to a control gain corresponding to the situation in which the robot climbs down the stairs or steps and may maintain the control gain corresponding to the situation.

Furthermore, when the robot completely climbs down the stairs or steps and travels on a flat ground again, the robot control apparatus may determine that the distance from the ground being sensed through the first sensor 601 is equal to the second reference value that is a reference value when the robot travels on the flat ground.

Accordingly, when it is determined that the distance X''' from the ground being sensed through the first sensor 601 in the situation in which the robot climbs down the stairs or steps is equal to the preset second reference value, the robot control apparatus may determine that the robot completely climbs down the stairs or steps.

When it is determined that the robot completely climbs down the stairs or steps, the robot control apparatus may adjust the control gain related to the balance control of the robot to a control gain corresponding to the situation in which the robot travels on the flat ground again and may maintain the control gain corresponding to the situation.

The above description has been made under the assumption that the sensor 601 located in the direction in which the robot climbs down the stairs or steps is the first sensor. However, even when the sensor 601 located in the direction in which the robot climbs down the stairs or steps is the second sensor, the robot control apparatus may determine, through a similar method, whether the robot climbs down the stairs or steps and whether the robot completely climbs down the stairs or steps.

Figure 7:
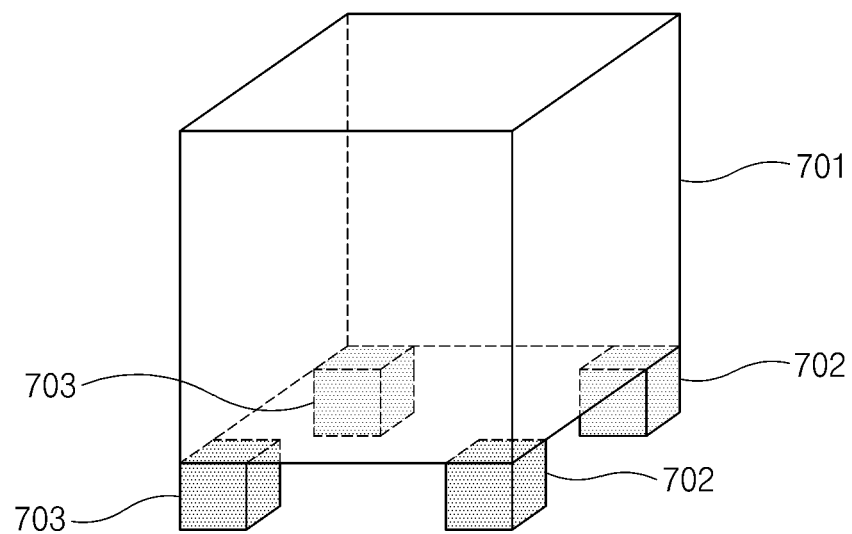
FIG. 7 is a view illustrating sensors of a robot control apparatus according to another embodiment of the present disclosure.

FIG. 7 is a view illustrating sensors of a robot control apparatus according to another embodiment of the present disclosure.

Referring to FIG. 7, the robot control apparatus may include first sensors 702 and second sensors 703 provided on the bottom of a head part 701.

For example, the first sensors 702 may be provided on a left side and a right side of the front bottom of the head part 701.

For example, the second sensors 703 may be provided on a left side and a right side of the rear bottom of the head part 701.

For example, based on the distances from the ground being measured through the first sensors 702 and/or the second sensors 703, the robot control apparatus may determine whether a robot travels on a flat ground, whether the robot climbs up stairs or steps, or whether the robot climbs down stairs or steps.

For example, by comparing the distance from the ground being sensed through the left first sensor 702 and the distance from the ground being sensed through the right first sensor 702 or comparing the distance from the ground being sensed through the left second sensor 703 and the distance from the ground being sensed through the right second sensor 703, the robot control apparatus may determine whether the left and right heights of the ground on which the robot travels differ from each other or whether the robot obliquely enters stairs or steps.

For example, when it is determined that the left and right heights of the ground on which the robot travels differ from each other or the robot obliquely enters the stairs or steps, the robot control apparatus may control the vertical heights of left and right wheels included in a wheel part.

For example, when it is determined that the left and right heights of the ground on which the robot travels differ from each other or the robot obliquely enters the stairs or steps, the robot control apparatus may maintain the left-right balance of the head part 701 by controlling the vertical heights of the left and right wheels included in the wheel part.

For example, when it is determined that the left and right heights of the ground on which the robot travels differ from each other or the robot obliquely enters the stairs or steps, if the distance from the ground being sensed through the left sensor (e.g., the left first sensor 702 or the left second sensor 703) is smaller than the distance from the ground being sensed through the right sensor, the robot control apparatus may maintain the left-right balance of the head part 701 by making the distance between the left wheel and the head part

701 shorter or making the distance between the right wheel and the head part 701 longer.

For example, when it is determined that the left and right heights of the ground on which the robot travels differ from each other or the robot obliquely enters the stairs or steps, if the distance from the ground being sensed through the right sensor (e.g., the right first sensor 702 or the right second sensor 703) is smaller than the distance from the ground being sensed through the left sensor, the robot control apparatus may maintain the left-right balance of the head part 701 by making the distance between the right wheel and the head part 701 shorter or making the distance between the left wheel and the head part 701 longer.

Figure 8A:
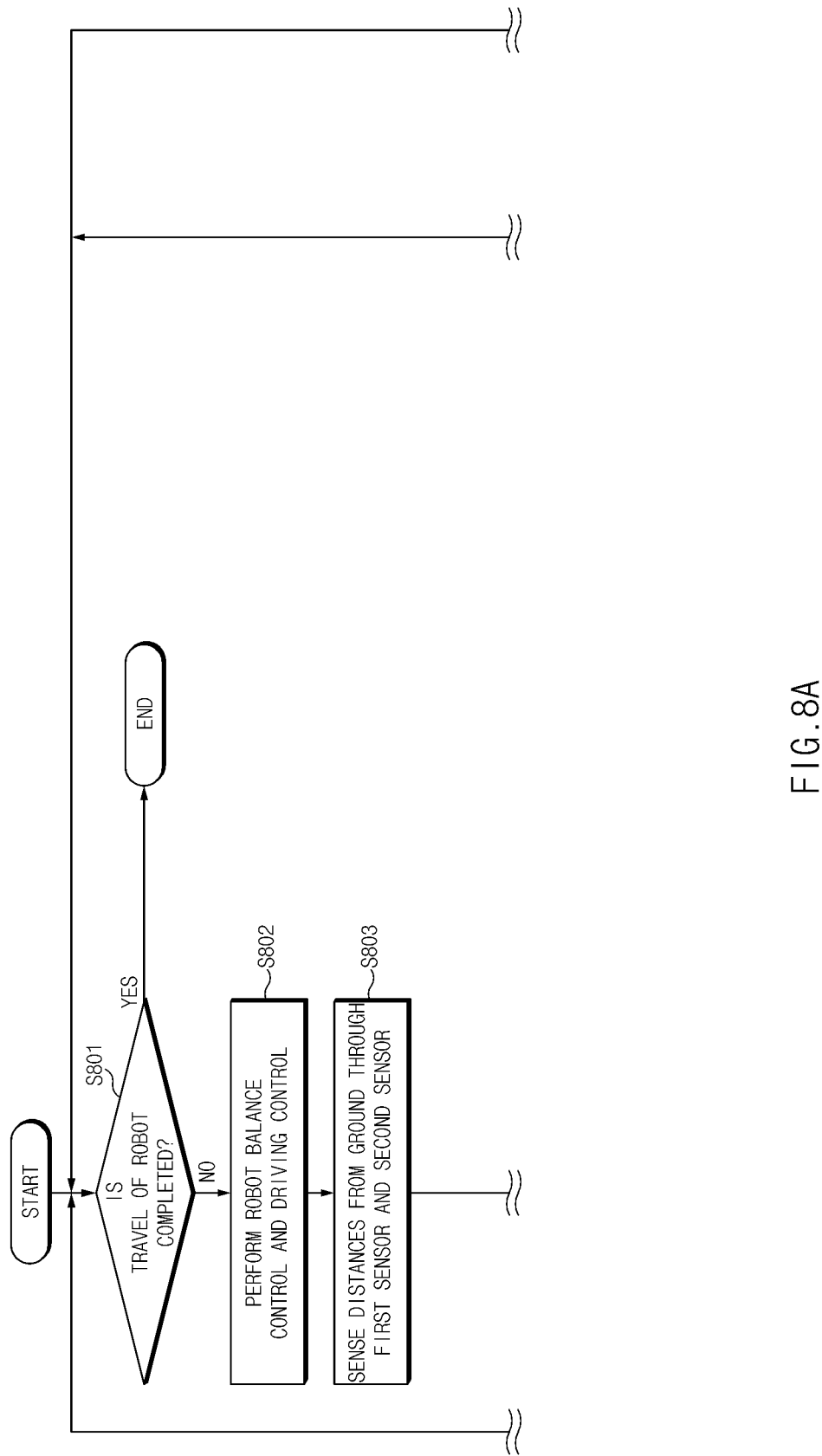
FIGS. 8 (8a and 8b together) is a flowchart illustrating an operation of a robot control apparatus according to an embodiment of the present disclosure.
Figure 8B:
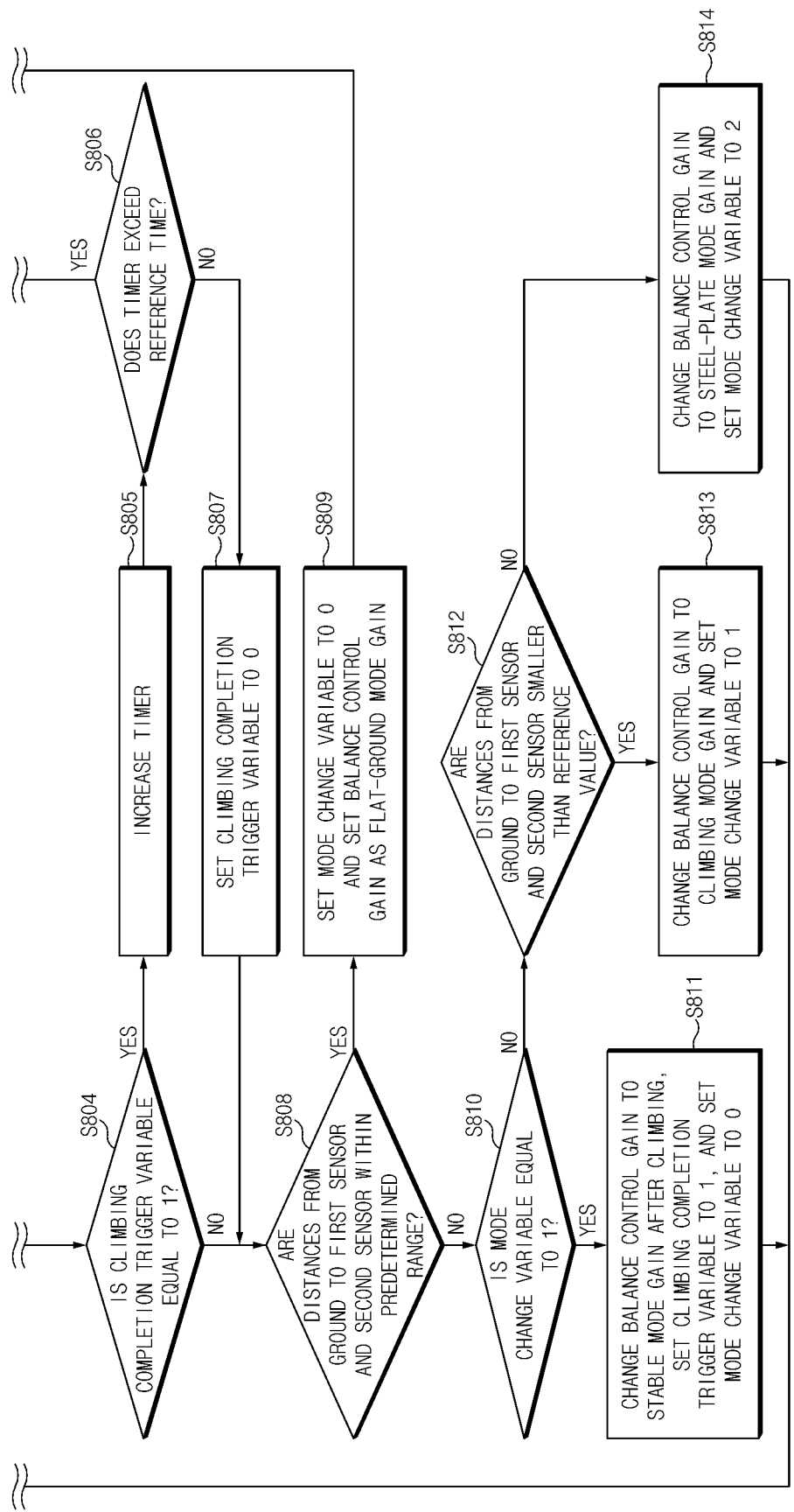

FIG. 8 (FIGS. 8a and 8b together) is a flowchart illustrating an operation of a robot control apparatus according to an embodiment of the present disclosure.

Hereinafter, it is assumed that the robot control apparatus 200 of FIG. 2 performs the process of FIG. 8. Furthermore, in the description of FIG. 8, operations set forth as being performed by the apparatus may be understood as being controlled by the controller 230 of the robot control apparatus 200.

Referring to FIG. 8, the robot control apparatus may determine whether travel of a robot is completed (S801).

When it is determined that the travel of the robot is not completed, the robot control apparatus may perform robot balance control and driving control (S802).

The robot control apparatus may sense the distances from the ground through the first sensor and the second sensor (S803).

The robot control apparatus may determine whether a climbing completion trigger variable is equal to 1 (S804).

When the climbing completion trigger variable is equal to 1, it may mean that the robot completely climbs up stairs or steps and is on a flat ground at present.

However, after the completion of the climbing, physical time may be required for the robot to take (stabilize) the center of gravity on the flat ground, and therefore the robot control apparatus may identify time through a timer.

When it is determined that the climbing completion trigger variable is equal to 1, the robot control apparatus may increase the timer (S805).

The robot control apparatus may determine whether the timer exceeds reference time (S806).

Here, the reference time may be determined depending on the physical time required for the robot to take (stabilize) the center of gravity on the flat ground after the completion of the climbing.

When it is determined that the timer does not exceed the reference time, the robot control apparatus may return to S801 and may determine whether the travel of the robot is completed.

When it is determined that the timber exceeds the reference time, the robot control apparatus may set the climbing completion trigger variable to 0 (S807).

When the climbing completion trigger variable is equal to 0, it may mean that the robot does not perform climbing or stabilization time elapses after climbing.

When it is determined that the climbing completion trigger variable is not equal to 1, the robot control apparatus may determine whether the distances from the ground to the first sensor and the second sensor are within a predetermined range (S808).

Here, the predetermined range may be a range set to determine that the robot travels on a flat ground. In particular, the predetermined range may be set to a range within a preset threshold value based on a first reference value corresponding to the height of a sensor from the ground when the robot travels on a flat ground.

When it is determined that the distances from the ground to the first sensor and the second sensor are within the predetermined range, the robot control apparatus may set a mode change variable to 0 and may set a balance control gain as a flat-ground mode gain (S809).

When the mode change variable is equal to 0, it may mean that the robot travels on a flat ground.

When it is determined that the distances from the ground to the first sensor and the second sensor are not within the predetermined range, the robot control apparatus may determine whether the mode change variable is equal to 1 (S810).

When the mode change variable is equal to 1, it may mean that the robot climbs up stairs or steps.

When it is determined that the mode change variable is equal to 1, the robot control apparatus may change the balance control gain to a stable mode gain after climbing, may set the climbing completion trigger variable to 1, and may set the mode change variable to 0 (S811).

When it is determined that the mode change variable is not equal to 1, the robot control apparatus may determine whether the distances from the ground to the first sensor and the second sensor are smaller than a reference value (S812).

Here, the reference value may refer to a reference value serving as a basis for determining a situation in which the robot climbs up stairs or steps.

When it is determined that the distances from the ground to the first sensor and the second sensor are smaller than the reference value, the robot control apparatus may change the balance control gain to a climbing mode gain and may set the mode change variable to 1 (S813).

When it is determined that the distances from the ground to the first sensor and the second sensor are not smaller than the reference value, the robot control apparatus may change the balance control gain to a steel-plate mode gain and may set the mode change variable to 2 (S814).

When the mode change variable is equal to 2, it may mean that the robot climbs down stairs or steps.

Figure 9:
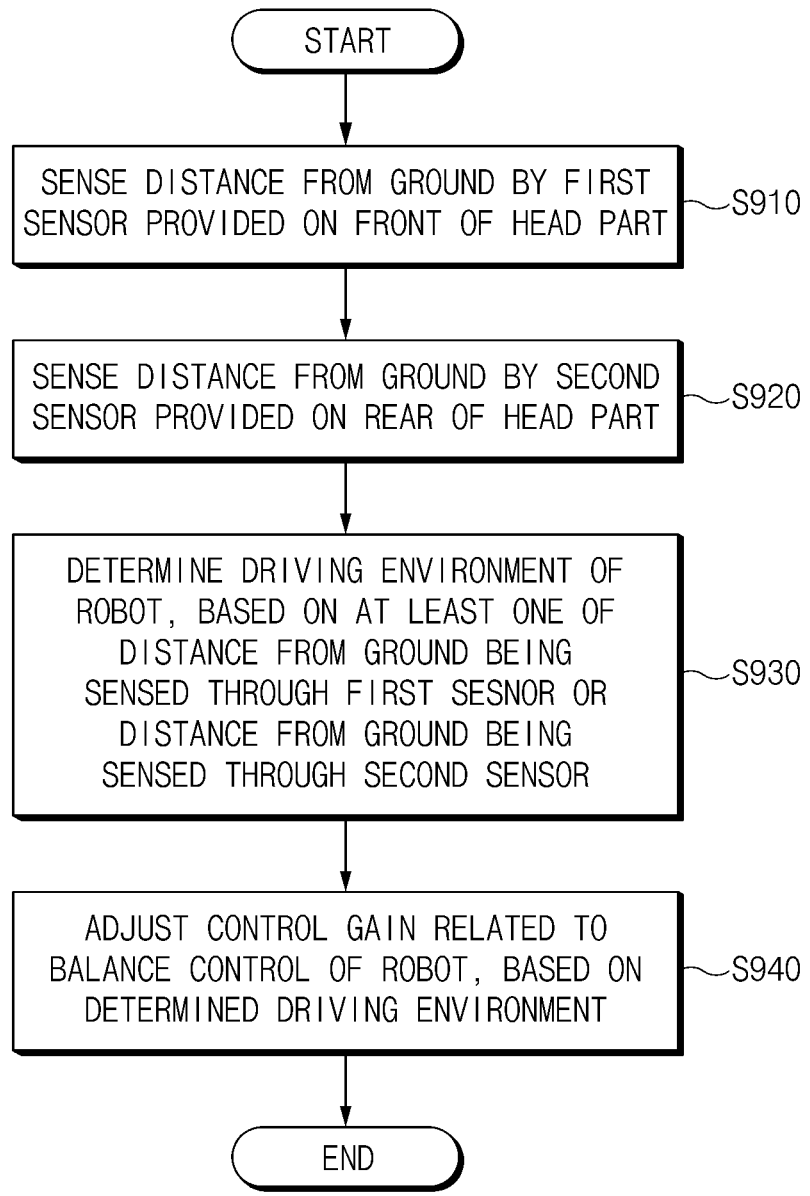
FIG. 9 is a flowchart illustrating a robot control method according to an embodiment of the present disclosure.

FIG. 9 is a flowchart illustrating a robot control method according to an embodiment of the present disclosure.

Referring to FIG. 9, the robot control method may include step S910 of sensing, by a first sensor provided on the front of a head part, the distance from the ground, step S920 of sensing, by a second sensor provided on the rear of the head part, the distance from the ground, step S930 of determining a driving environment of a robot, based on at least one of the distance from the ground being sensed through the first sensor or the distance from the ground being sensed through the second sensor, and step S940 of adjusting a control gain related to balance control of the robot, based on the determined driving environment.

Step S910 of sensing, by the first sensor provided on the front of the head part, the distance from the ground may be performed by the first sensor, which is disposed on the front bottom of the head part, through control of a controller.

Step S920 of sensing, by the second sensor provided on the rear of the head part, the distance from the ground may be performed by the second sensor, which is disposed on the rear bottom of the head part, through control of the controller.

Step S930 of determining the driving environment of the robot, based on at least one of the distance from the ground being sensed through the first sensor or the distance from the ground being sensed through the second sensor may be performed by the controller.

For example, step S930 of determining the driving environment of the robot, based on at least one of the distance from the ground being sensed through the first sensor or the distance from the ground being sensed through the second sensor may include a step of determining, by the controller, whether the driving environment of the robot corresponds to at least one of a situation in which the robot travels on a flat ground, a situation in which the robot climbs up stairs or steps, or a situation in which the robot climbs down stairs or steps.

For example, step S930 of determining the driving environment of the robot, based on at least one of the distance from the ground being sensed through the first sensor or the distance from the ground being sensed through the second sensor may include a step of determining, by the controller, whether the driving environment of the robot corresponds to a situation in which the robot travels on a flat ground, based on whether the distance from the ground being sensed through the first sensor and the distance from the ground being sensed through the second sensor are within a threshold value from a first reference value.

For example, step S930 of determining the driving environment of the robot, based on at least one of the distance from the ground being sensed through the first sensor or the distance from the ground being sensed through the second sensor may include a step of determining, by the controller, whether the driving environment of the robot corresponds to a situation in which the robot climbs up stairs or steps, based on whether the distance from the ground being sensed through the first sensor or the distance from the ground being sensed through the second sensor is smaller than or equal to a second reference value.

For example, step S930 of determining the driving environment of the robot, based on at least one of the distance from the ground being sensed through the first sensor or the distance from the ground being sensed through the second sensor may include a step of determining, by the controller, whether the driving environment of the robot corresponds to a situation in which the robot climbs down stairs or steps, based on whether the distance from the ground being sensed through the first sensor or the distance from the ground being sensed through the second sensor is greater than or equal to a third reference value.

For example, step S930 of determining the driving environment of the robot, based on at least one of the distance from the ground being sensed through the first sensor or the distance from the ground being sensed through the second sensor may include a step of determining, by the controller, whether a situation in which the robot climbs up stairs or steps is completed, based on whether the distance from the ground being sensed through the first sensor or the distance from the ground being sensed through the second sensor in the situation in which the robot climbs up the stairs or steps is smaller than or equal to a fourth reference value.

For example, step S930 of determining the driving environment of the robot, based on at least one of the distance from the ground being sensed through the first sensor or the distance from the ground being sensed through the second sensor may include a step of determining, by the controller, the driving environment of the robot in consideration of the amount of current to drive wheels included in a wheel part.

For example, step S930 of determining the driving environment of the robot, based on at least one of the distance from the ground being sensed through the first sensor or the distance from the ground being sensed through the second sensor may include a step of determining, by the controller, the driving environment of the robot in consideration of the amount of torque of the wheels included in the wheel part.

For example, step S930 of determining the driving environment of the robot, based on at least one of the distance from the ground being sensed through the first sensor or the distance from the ground being sensed through the second sensor may include a step of determining, by the controller, the driving environment of the robot in consideration of the degree to which a head part is inclined.

Step S940 of adjusting the control gain related to the balance control of the robot, based on the determined driving environment may be performed by the controller.

For example, step S940 of adjusting the control gain related to the balance control of the robot, based on the determined driving environment may include a step of adjusting, by the controller, the control gain related to the balance control of the robot to a first control gain corresponding to a situation in which the robot travels on a flat ground, when it is determined that the driving environment of the robot corresponds to the situation in which the robot travels on the flat ground.

For example, step S940 of adjusting the control gain related to the balance control of the robot, based on the determined driving environment may include a step of adjusting, by the controller, the control gain related to the balance control of the robot to a second control gain corresponding to a situation in which the robot climbs up stairs or steps, when it is determined that the driving environment of the robot corresponds to the situation in which the robot climbs up the stairs or steps.

For example, step S940 of adjusting the control gain related to the balance control of the robot, based on the determined driving environment may include a step of adjusting, by the controller, the control gain related to the balance control of the robot to a third control gain corresponding to a situation in which the robot climbs down stairs or steps, when it is determined that the driving environment of the robot corresponds to the situation in which the robot climbs down the stairs or steps.

For example, step S940 of adjusting the control gain related to the balance control of the robot, based on the determined driving environment may include a step of adjusting, by the controller, the control gain related to the balance control of the robot to a fourth control gain corresponding to completion of a situation in which the robot climbs up stairs or steps and maintaining the fourth control gain until a preset period of time elapses, when it is determined that the situation in which the robot climbs up the stairs or steps is completed.

Figure 10:
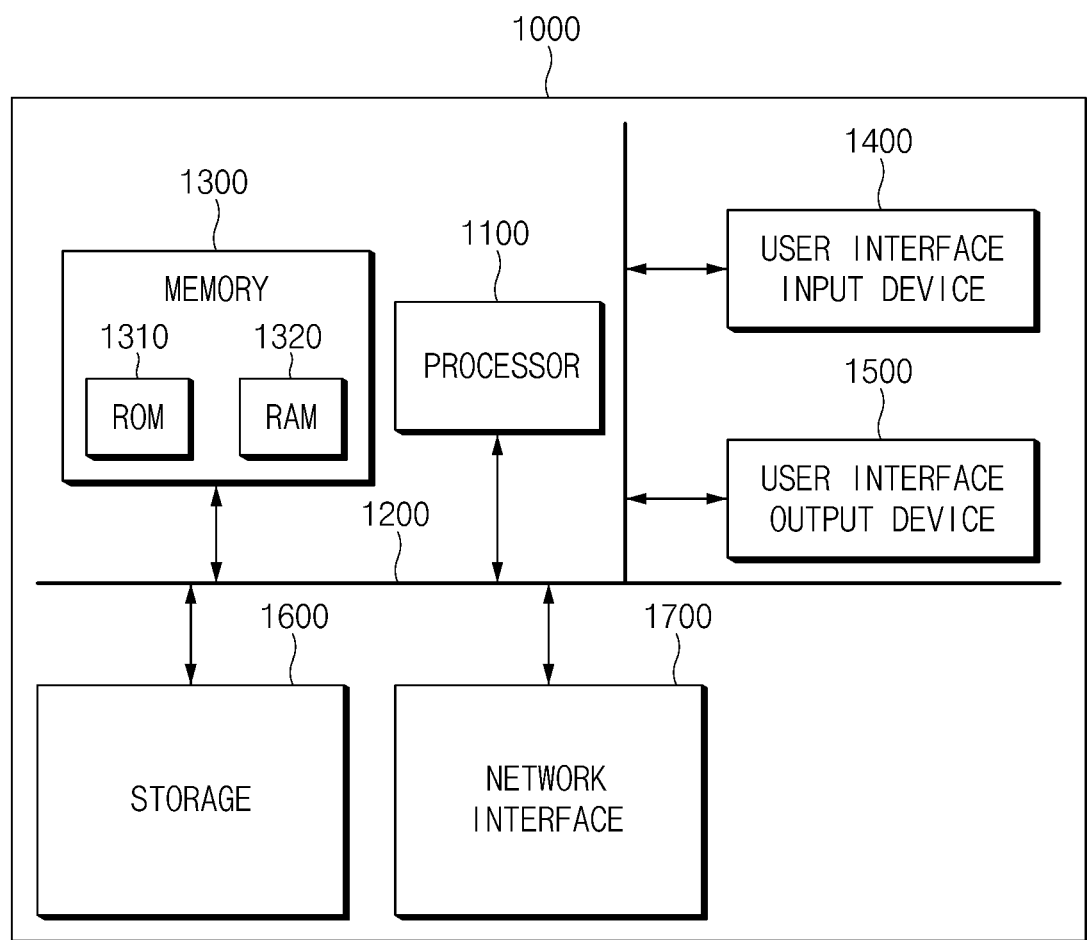
FIG. 10 illustrates a computing system according to an embodiment of the present disclosure.

FIG. 10 illustrates a computing system according to an embodiment of the present disclosure.

Referring to FIG. 10, the computing system moo may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, or a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

Effects of the robot control apparatus and method according to the present disclosure will be described below.

According to at least one of the embodiments of the present disclosure, the robot control apparatus and method may adjust the control gain of the robot that moves through the wheels.

According to at least one of the embodiments of the present disclosure, the robot control apparatus and method may apply the different control gains of the balance control depending on the driving environments.

According to at least one of the embodiments of the present disclosure, the robot control apparatus and method may automatically adjust the control gain of the robot such that manual control is not required.

According to at least one of the embodiments of the present disclosure, the robot control apparatus and method may perform the stable balance control of the robot by automatically adjusting the control gain related to the balance control of the robot.

According to at least one of the embodiments of the present disclosure, the robot control apparatus and method may recognize the driving environment using the simple distance sensor rather than a sensor having a complex structure, such as lidar, camera, radar, or the like, and may perform the appropriate balance control of the robot corresponding to the driving environment.

In addition, the present disclosure may provide various effects that are directly or indirectly recognized.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A robot control apparatus comprising:
at least one first sensor provided on a front of a head part of a robot including a wheel part and the head part connected to an upper portion of the wheel part, the first sensor being configured to sense a first distance from a ground;
at least one second sensor provided on a rear of the head part and configured to sense a second distance from the ground; and
a controller configured to:
determine a driving environment of the robot based on at least one of the first distance or the second distance;
adjust a control gain related to a balance control of the robot based on the determined driving environment;
determine that the robot has finished driving in the driving environment; and
in response to determining that the robot has finished driving in the driving environment, maintain the control gain related to the balance control of the robot until a preset time has elapsed.

2. The robot control apparatus of claim 1, wherein the controller is configured to determine whether the driving environment of the robot corresponds to at least one of a situation in which the robot travels on a flat ground, a situation in which the robot climbs up stairs or steps, or a situation in which the robot climbs down the stairs or the steps.

3. The robot control apparatus of claim 1, wherein the first sensor is disposed on a front bottom of the head part, and wherein the second sensor is disposed on a rear bottom of the head part.

4. The robot control apparatus of claim 1, wherein the controller is configured to:
determine whether the driving environment of the robot corresponds to a situation in which the robot travels on a flat ground based on whether the first distance and the second distance are within a threshold value from a first reference value; and
adjust the control gain related to the balance control of the robot to a first control gain corresponding to the situation in which the robot travels on the flat ground when it is determined that the driving environment of the robot corresponds to the situation in which the robot travels on the flat ground.

5. The robot control apparatus of claim 1, wherein the controller is configured to:
determine whether the driving environment of the robot corresponds to a situation in which the robot climbs up stairs or steps based on whether the first distance or the second distance is smaller than or equal to a second reference value; and
adjust the control gain related to the balance control of the robot to a second control gain corresponding to the situation in which the robot climbs up the stairs or the steps when it is determined that the driving environment of the robot corresponds to the situation in which the robot climbs up the stairs or the steps.

6. The robot control apparatus of claim 5, wherein the controller is configured to:
determine whether the situation in which the robot climbs up the stairs or the steps is completed based on whether the first distance or the second distance in the situation in which the robot climbs up the stairs or the steps is smaller than or equal to a fourth reference value; and
adjust the control gain related to the balance control of the robot to a fourth control gain corresponding to a completion of the situation in which the robot climbs up the stairs or the steps when it is determined that the situation in which the robot climbs up the stairs or steps is completed.

7. The robot control apparatus of claim 1, wherein the controller is configured to:
   determine whether the driving environment of the robot corresponds to a situation in which the robot climbs down stairs or steps based on whether the first distance or the second distance from the ground is greater than or equal to a third reference value; and
   adjust the control gain related to the balance control of the robot to a third control gain corresponding to the situation in which the robot climbs down the stairs or the steps when it is determined that the driving environment of the robot corresponds to the situation in which the robot climbs down the stairs or the steps.

8. The robot control apparatus of claim 1, wherein the controller is configured to determine the driving environment of the robot in consideration of an amount of current to drive a wheel included in the wheel part.

9. The robot control apparatus of claim 1, wherein the controller is configured to determine the driving environment of the robot in consideration of an amount of torque of a wheel included in the wheel part.

10. The robot control apparatus of claim 1, wherein the controller is configured to determine the driving environment of the robot in consideration of a degree to which the head part is inclined.

11. The robot control apparatus of claim 1,
    wherein the at least one first sensor includes a sensor provided on a front left side of the head part and a sensor provided on a front right side of the head part,
    wherein the at least one second sensor includes a sensor provided on a rear left side of the head part and a sensor provided on a rear right side of the head part, and
    wherein the controller is configured to control vertical heights of left and right wheels included in the wheel part based on at least one of the first distance or the second distance.

12. A method for controlling a robot, the method comprising:
    sensing, by at least one first sensor, a first distance from a ground, the first sensor being provided on a front of a head part of the robot including a wheel part, wherein the head part is connected to an upper portion of the wheel part;
    sensing, by at least one second sensor, a second distance from the ground, the second sensor being provided on a rear of the head part;
    determining, by a controller, a driving environment of the robot based on at least one of the first distance or the second distance;
    adjusting, by the controller, a control gain related to a balance control of the robot based on the determined driving environment;
    determine, by the controller, that the robot has finished driving in the driving environment; and
    in response to determining that the robot has finished driving in the driving environment, maintain the control gain related to the balance control of the robot until a preset time has elapsed.

13. The method of claim 12, wherein determining, by the controller, the driving environment of the robot includes determining, by the controller, whether the driving environment of the robot corresponds to at least one of a situation in which the robot travels on a flat ground, a situation in which the robot climbs up stairs or steps, or a situation in which the robot climbs down the stairs or the steps.

14. The method of claim 12,
    wherein determining, by the controller, the driving environment of the robot includes determining, by the controller, whether the driving environment of the robot corresponds to a situation in which the robot travels on a flat ground based on whether the first distance and the second distance are within a threshold value from a first reference value, and
    wherein adjusting, by the controller, the control gain related to the balance control of the robot includes adjusting, by the controller, the control gain related to the balance control of the robot to a first control gain corresponding to the situation in which the robot travels on the flat ground when it is determined that the driving environment of the robot corresponds to the situation in which the robot travels on the flat ground.

15. The method of claim 12,
    wherein determining, by the controller, the driving environment of the robot includes determining, by the controller, whether the driving environment of the robot corresponds to a situation in which the robot climbs up stairs or steps based on whether the first distance or the second distance is smaller than or equal to a second reference value, and
    wherein adjusting, by the controller, the control gain related to the balance control of the robot includes adjusting, by the controller, the control gain related to the balance control of the robot to a second control gain corresponding to the situation in which the robot climbs up the stairs or the steps when it is determined that the driving environment of the robot corresponds to the situation in which the robot climbs up the stairs or steps.

16. The method of claim 15,
    wherein determining, by the controller, the driving environment of the robot further includes determining, by the controller, whether the situation in which the robot climbs up the stairs or the steps is completed based on whether the first distance or the second distance in the situation in which the robot climbs up the stairs or the steps is smaller than or equal to a fourth reference value, and
    wherein adjusting, by the controller, the control gain related to the balance control of the robot further includes adjusting, by the controller, the control gain related to the balance control of the robot to a fourth control gain corresponding to the completion of the situation in which the robot climbs up the stairs or the steps and maintaining, by the controller, the fourth control gain until a preset period of time elapses when it is determined that the situation in which the robot climbs up the stairs or the steps is completed.

17. The method of claim 12,
    wherein determining, by the controller, the driving environment of the robot includes determining, by the controller, whether the driving environment of the robot corresponds to a situation in which the robot climbs down stairs or steps based on whether the first distance or the second distance is greater than or equal to a third reference value, and
    wherein adjusting, by the controller, the control gain related to the balance control of the robot includes adjusting, by the controller, the control gain related to the balance control of the robot to a third control gain corresponding to the situation in which the robot climbs down the stairs or the steps when it is determined that the driving environment of the robot corresponds to the situation in which the robot climbs down the stairs or steps.

18. The method of claim 12, wherein determining, by the controller, the driving environment of the robot includes determining, by the controller, the driving environment of the robot in consideration of at least one of an amount of current to drive a wheel included in the wheel part, an amount of torque of the wheel included in the wheel part, or a degree to which the head part is inclined.

19. The method of claim 12,
wherein the at least one first sensor includes a sensor provided on a front left side of the head part and a sensor provided on a front right side of the head part,
wherein the at least one second sensor includes a sensor provided on a rear left side of the head part and a sensor provided on a rear right side of the head part, and
wherein the method further comprises controlling, by the controller, vertical heights of left and right wheels included in the wheel part, based on at least one of the distance from the ground being sensed through the at least one first sensor or the distance from the ground being sensed through the at least one second sensor.

20. A robot control apparatus comprising:
at least one first sensor provided on a front of a head part of a robot including a wheel part and the head part connected to an upper portion of the wheel part, the first sensor being configured to sense a first distance from a ground;
at least one second sensor provided on a rear of the head part and configured to sense a second distance from the ground; and
a controller configured to:
    determine a driving environment of the robot based on at least one of the first distance or the second distance; and
    adjust a control gain related to a balance control of the robot based on the determined driving environment,
wherein the controller is further configured to:
    determine whether a situation in which the robot climbs up stairs or steps is completed based on whether the first distance or the second distance in the situation in which the robot climbs up the stairs or the steps is smaller than or equal to a fourth reference value;
    adjust the control gain related to the balance control of the robot to a fourth control gain corresponding to a completion of the situation in which the robot climbs up the stairs or the steps when it is determined that the situation in which the robot climbs up the stairs or the steps is completed; and
    maintain the control gain related to the balance control of the robot at the fourth control gain until a preset period of time elapses when the situation in which the robot climbs up the stairs or the steps is completed.

\* \* \* \* \*